United States Patent
Tokumaru et al.

(10) Patent No.: US 11,198,458 B2
(45) Date of Patent: Dec. 14, 2021

(54) SPEED CONTROL DEVICE, WIRELESS TRAIN CONTROL SYSTEM, AND SPEED CONTROL METHOD

(71) Applicant: MITSUBISHI ELECTRIC CORPORATION, Tokyo (JP)

(72) Inventors: Makoto Tokumaru, Tokyo (JP); Satoshi Nakamura, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 508 days.

(21) Appl. No.: 15/998,641

(22) PCT Filed: Feb. 22, 2016

(86) PCT No.: PCT/JP2016/055113
§ 371 (c)(1),
(2) Date: Aug. 16, 2018

(87) PCT Pub. No.: WO2017/145246
PCT Pub. Date: Aug. 31, 2017

(65) Prior Publication Data
US 2019/0359236 A1     Nov. 28, 2019

(51) Int. Cl.
*B61L 25/02* (2006.01)
*B61L 27/00* (2006.01)
*B61L 27/04* (2006.01)

(52) U.S. Cl.
CPC ............ *B61L 25/021* (2013.01); *B61L 25/02* (2013.01); *B61L 25/025* (2013.01); *B61L 27/0038* (2013.01); *B61L 27/04* (2013.01)

(58) Field of Classification Search
CPC .. B61L 25/021; B61L 25/025; B61L 27/0038; B61L 27/04; B61L 25/026; B61L 25/02; B61L 25/028
(Continued)

(56) References Cited

U.S. PATENT DOCUMENTS 4,710,865 A * 12/1987 Higomura ............ G05B 19/232
318/592
8,175,764 B2 * 5/2012 Kernwein ............. B61L 25/025
701/20
(Continued)

FOREIGN PATENT DOCUMENTS

JP     H06-197404 A     7/1994
JP     08-340607 A     12/1996
(Continued)

OTHER PUBLICATIONS

Extended European Search Report dated Oct. 25, 2018, issued by the European Patent Office in corresponding European Application No. 16891405.9. (7 pages).
(Continued)

*Primary Examiner* — Zachary L Kuhfuss
*Assistant Examiner* — Cheng Lin
(74) *Attorney, Agent, or Firm* — Buchanan Ingersoll & Rooney PC (57) ABSTRACT

A speed control device that controls a speed of a train using a tacho-generator includes a calculating unit that calculates, when a pulse count signal obtained by conversion from an AC voltage signal that is outputted from the tacho-generator and corresponds to a rotating speed of a wheel of the train cannot be detected, a first speed using notch information, route data, and car characteristic data and calculates, when the pulse count signal can be detected, a second speed using the pulse count signal. The speed control device includes a position calculating unit that calculates a position of the train using the speed calculated by the calculating unit.

3 Claims, 12 Drawing Sheets

(58) Field of Classification Search
USPC .................................................... 701/19–20
See application file for complete search history.

(56) References Cited

U.S. PATENT DOCUMENTS

| | | | | |
|---|---|---|---|---|
| 8,670,883 B2* | 3/2014 | Takagi | .................... | B60L 15/40 |
| | | | | 701/20 |
| 9,026,284 B2* | 5/2015 | Kumar | .................... | B61D 17/12 |
| | | | | 701/20 |
| 9,809,235 B2* | 11/2017 | Jung | .................... | B61L 27/0094 |
| 10,640,134 B2* | 5/2020 | Tsujita | ................ | B61L 15/0027 |
| 2013/0006452 A1 | 1/2013 | Takagi | | |

FOREIGN PATENT DOCUMENTS

| | | | | |
|---|---|---|---|---|
| JP | 2003-004758 A | 1/2003 | | |
| JP | 2005-012853 A | 1/2005 | | |
| JP | 2008-182808 A | 8/2008 | | |
| JP | 2012-058059 A | 3/2012 | | |
| WO | 2011/135626 A1 | 11/2011 | | |
| WO | WO-2017046852 A1 * | 3/2017 | ................ | B60T 7/12 |

OTHER PUBLICATIONS

International Search Report (PCT/ISA/210) dated Apr. 26, 2016, by the Japanese Patent Office as the International Searching Authority for International Application No. PCT/JP2016/055113.
Written Opinion (PCT/ISA/237) dated Apr. 26, 2016, by the Japanese Patent Office as the International Searching Authority for International Application No. PCT/JP2016/055113.
Office Action dated Jan. 2, 2020, issued in corresponding Indian Patent Application No. 201847029190, 6 pages.

* cited by examiner

SPEED CONTROL DEVICE, WIRELESS TRAIN CONTROL SYSTEM, AND SPEED CONTROL METHOD

FIELD

The present invention relates to a speed control device, a wireless train control system, and a speed control method, which are intended to control a train speed using a tacho-generator.

BACKGROUND

A conventional speed control device converts an AC voltage outputted from a tacho-generator into a pulse signal, and counts the number of pulses of the pulse signal to calculate a rotating speed of a wheel. To achieve a reduction in an error of a train speed using a tacho-generator, the conventional technique disclosed in Patent Literature 1 includes the tacho-generator and a sampling circuit that counts pulses sent from the tacho-generator, wherein the sampling circuit counts, at every sampling time, the number of rising edges and the number of falling edges of the pulses and calculates a speed of a train on the basis of the counted number of pulses for each sampling time.

CITATION LIST

Patent Literature

Patent Literature 1: Japanese Patent Application Laid-Open No. 2012-58059

SUMMARY

Technical Problem

In a tacho-generator mounted on a train, when a train speed is lower than a fixed speed in a low speed region, a generated voltage drops, and thereby it is difficult to convert an AC voltage into a pulse signal. Because it is difficult to detect the pulse signal in the low speed region, in the conventional technique represented by Patent Literature 1, it is difficult to calculate a train speed in the low speed region simply by using the tacho-generator, thereby leading to a decrease of calculation accuracy of a train position. To improve the calculation accuracy of the train speed in the low speed region, use of a pulse generation circuit that generates a pulse signal even in the low speed region suffices. However, compared with a tacho-generator having a simple structure, such a pulse generation circuit leads to an increase in cost and deterioration in reliability. Therefore, in general, under the present situation, such a pulse generation circuit is not used.

The present invention has been devised in view of the above circumstances, and an object of the present invention is to provide a speed control device that can calculate a train speed using a tacho-generator even in a low speed region.

Solution to Problem

In order to solve the problems described above and achieve the object, the present invention provides a speed control device that controls a speed of a train using a tacho-generator, comprising: a calculating unit to calculate a first speed using notch information outputted from a master controller, information of a route database for managing route data, and information of a car characteristic database for managing car characteristic data when a pulse count signal corresponding to the number of revolutions of a wheel of the train cannot be detected using an AC voltage signal that is outputted from the tacho-generator, and calculate a second speed using the pulse count signal when the pulse count signal can be detected.

Advantageous Effects of Invention

According to the present invention, there is an advantageous effect that it is possible to calculate a train speed using a tacho-generator even in a low speed region.

DESCRIPTION OF EMBODIMENTS

Speed control devices, wireless train control systems, and speed control methods according to embodiments of the present invention are described in detail below with reference to the drawings. Note that the present invention is not necessarily limited by these embodiments.

First Embodiment

Figure 1:
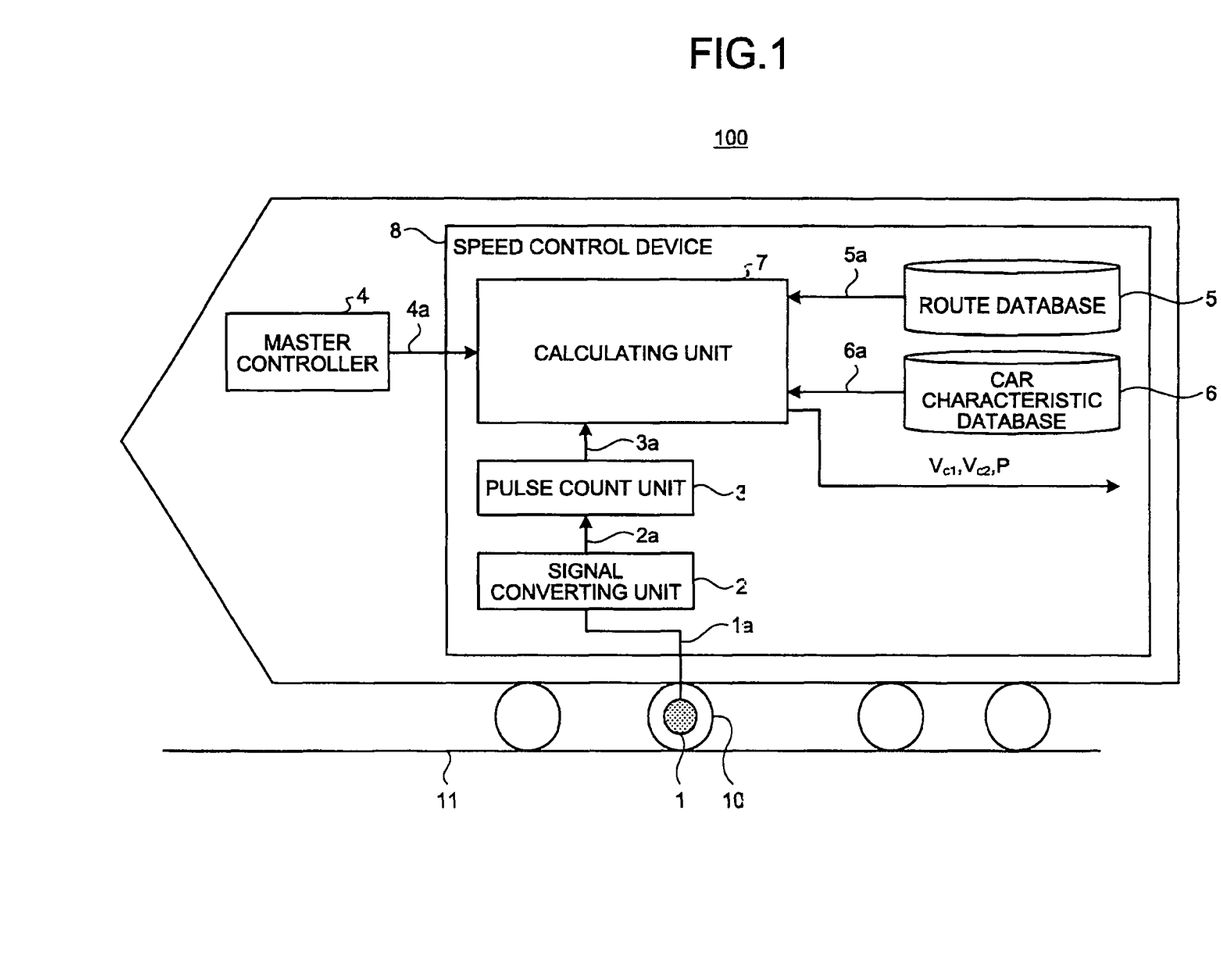
FIG. 1 is a diagram illustrating a train equipped with a speed control device according to a first embodiment of the present invention.

FIG. 1 is a diagram illustrating a train mounted with a speed control device according to a first embodiment of the present invention. A train 100 has a wheel 10 provided for the train to travel on a rail 11. The wheel 10 is driven to rotate by a main electric motor not illustrated in the figure.

A tacho-generator 1 is provided in an axle of the wheel 10. The tacho-generator 1 generates a sine wave voltage having one cycle for one rotation of the axle, that is, one cycle per revolution of the wheel 10. Specifically, a rotor incorporated in the tacho-generator 1 rotates with revolution of the axle and a teeth part formed on the outer circumferential surface of the rotor passes a magnetic pole piece, whereby an AC voltage that cyclically changes is generated in a coil wound on the magnetic pole piece. The AC voltage is outputted as an AC voltage signal 1a corresponding to the number of revolutions of the wheel 10.

In the train 100, a speed control device 8 for controlling a train speed and a master controller 4 are provided. The speed control device 8 includes a signal converting unit 2, a pulse count unit 3, a calculating unit 7, a route database 5, and a car characteristic database 6. The speed control device 8 may include a train-speed controlling function besides functions of these components. As an example of the train-speed controlling function, it is possible to exemplify a protective device that compares the position and the speed of the train with a speed control pattern and accordingly controls the speed of the train 100.

The signal converting unit 2 converts the AC voltage signal outputted from the tacho-generator 1 into a pulse signal 2a having a rectangular wave and outputs the pulse signal 2a.

The pulse count unit 3 counts the number of pulse signals 2a generated per unit time and outputs a pulse count signal 3a. That is, the pulse count unit 3 outputs pulse count signals 3a in a number corresponding to the number of revolutions of the wheel 10. The pulse count unit 3 counts the number of pulse signals 2a with regarding a section from a rising edge to a falling edge of the pulse signal 2a as one pulse.

The master controller 4 is set in a not-illustrated motorman's cab of the train 100, determines a power running notch and a brake notch, and outputs the power running notch and brake notch as notch information 4a. The master controller 4 outputs control information necessary for train operation such as information indicating a traveling direction of the train 100 besides the notch information 4a.

In the route database 5, a track profile such as a gradient and a curvature radius corresponding to kilometrage of a route is registered as route data 5a.

In the car characteristic database 6, the weights of cars of the train 100, a tractive force corresponding to a notch speed, and a brake force corresponding to the notch speed are registered as car characteristic data 6a.

The calculating unit 7 calculates a first speed $V_{c1}$ and a second speed $V_{c2}$ at every fixed cycle using the pulse count signal 3a, the notch information 4a, the route data 5a, and the car characteristic data 6a. The calculating unit 7 retains the calculated first speed $V_{c1}$ and the calculated second speed $V_{c2}$ as speed information Vn and outputs the speed information Vn to a controlled element that uses the speed information Vn.

Figure 2:
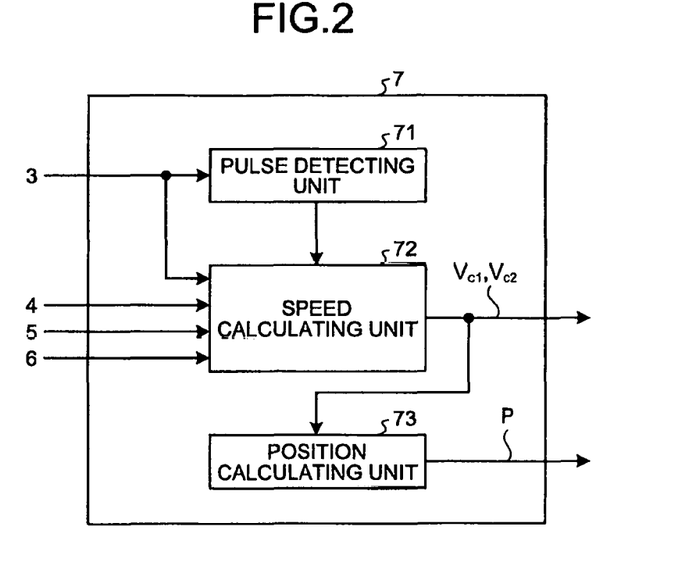
FIG. 2 is a configuration diagram of the speed control device according to the first embodiment of the present invention.

FIG. 2 is a configuration diagram of the speed control device according to the first embodiment of the present invention. The calculating unit 7 illustrated in FIG. 2 includes a pulse detecting unit 71, a speed calculating unit 72, and a position calculating unit 73.

The pulse detecting unit 71 determines whether or not the pulse count signal 3a can be detected.

When the pulse detecting unit 71 cannot detect the pulse count signal 3a, the speed calculating unit 72 calculates a new first speed $V_{c1}$ using the notch information 4a, the route data 5a, the car characteristic data 6a, and the last value of the first speed $V_{c1}$ calculated in the immediately preceding calculation cycle.

When the pulse detecting unit 71 can detect the pulse count signal 3a, the speed calculating unit 72 calculates the second speed $V_{c2}$ on the basis of the number of counts of the pulse count signal 3a.

The position calculating unit 73 calculates, according to the following Expression (1), a position P of a leading car of the train 100 Δt seconds after the present time using the present first speed $V_{c1}$ or the present second speed $V_{c2}$ calculated by the speed calculating unit 72.

$$\text{Position } P \text{ after } \Delta t \text{ seconds=present position } P+\Delta t\times \text{present speed} \qquad (1)$$

Next, the operation of the speed control device 8 is explained. In the following explanation, calculation operations in the speed calculating unit 72 and the position calculating unit 73 are explained with reference to FIG. 3 and, then, the operation of the speed control device 8 is explained with reference to FIG. 4.

Figure 3:
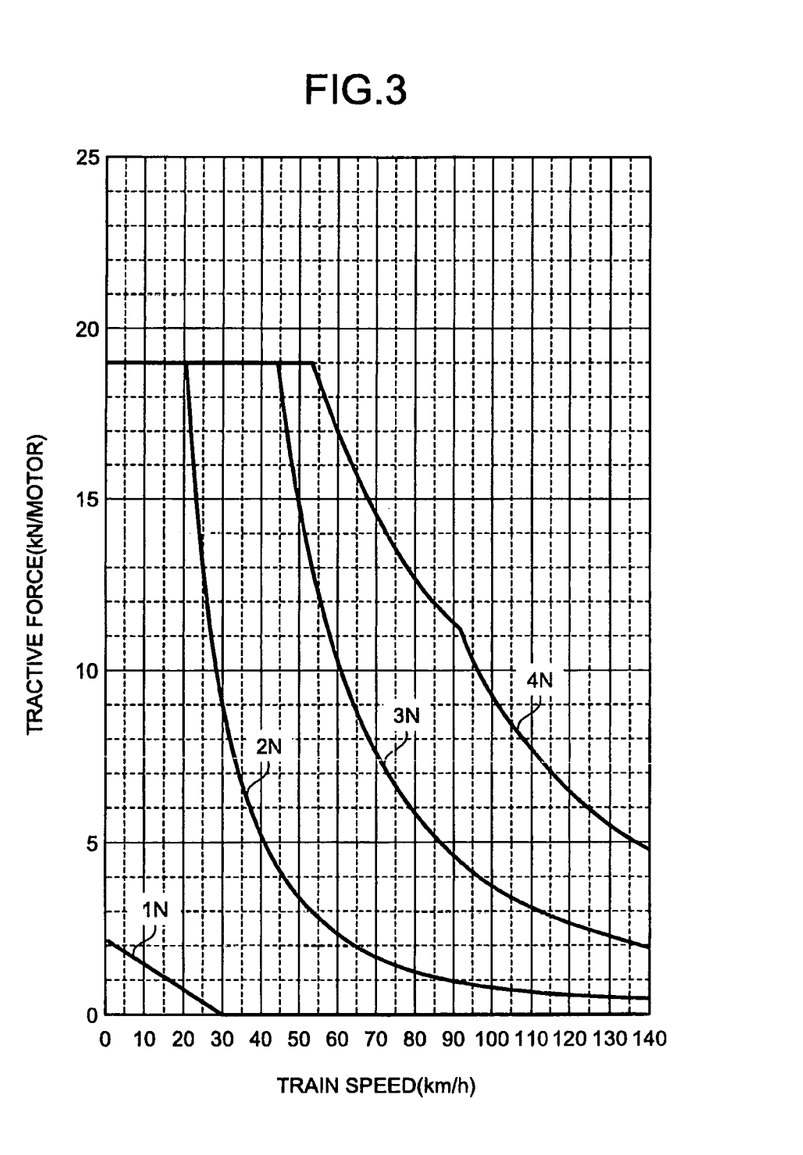
FIG. 3 is a graph showing a power running performance curve used in calculating a speed of a train.

FIG. 3 is a graph illustrating a power running performance curve used in calculating a speed of the train. The vertical axis indicates a tractive force per one motor mounted on the train 100. The horizontal axis indicates a speed of the train. In FIG. 3, power running performance curves corresponding to four power running notches 1N, 2N, 3N, and 4N, respectively, are illustrated as an example. The power running performance curves represent relations between tractive forces and train speeds corresponding to the power running notches and are called tractive force curves as well. Two or more power running performance curve information pieces are set in the calculating unit 7 in advance. The speed calculating unit 72 of the calculating unit 7 captures the notch information 4a at any time and accordingly selects a power running performance curve corresponding to a power running notch.

When the pulse count signal 3a is not detected, the calculating unit 7 calculates a tractive force and an acceleration at the present point in time using the selected power running performance curve and the present speed and calculates a speed Δt seconds later to thereby calculate the first speed $V_{c1}$. When the pulse count signal 3a is detected, the calculating unit 7 calculates the second speed $V_{c2}$ for accelerating the train according to the selected power running performance curve.

Concerning brakes, similarly, brake performance curves corresponding to a number of brake notches, respectively, are set in the calculating unit 7. The speed calculating unit 72 of the calculating unit 7 captures the notch information 4a at any time and accordingly selects a brake performance curve corresponding to a brake notch.

When the pulse count signal 3a is not detected, the calculating unit 7 calculates a deceleration at the present point in time using the selected brake performance curve and the present speed and calculates a speed Δt seconds later to thereby calculate the first speed $V_{c1}$. When the pulse count signal 3a is detected, the calculating unit 7 calculates the second speed $V_{c2}$ for decelerating the train according to the selected brake performance curve.

Figure 4:
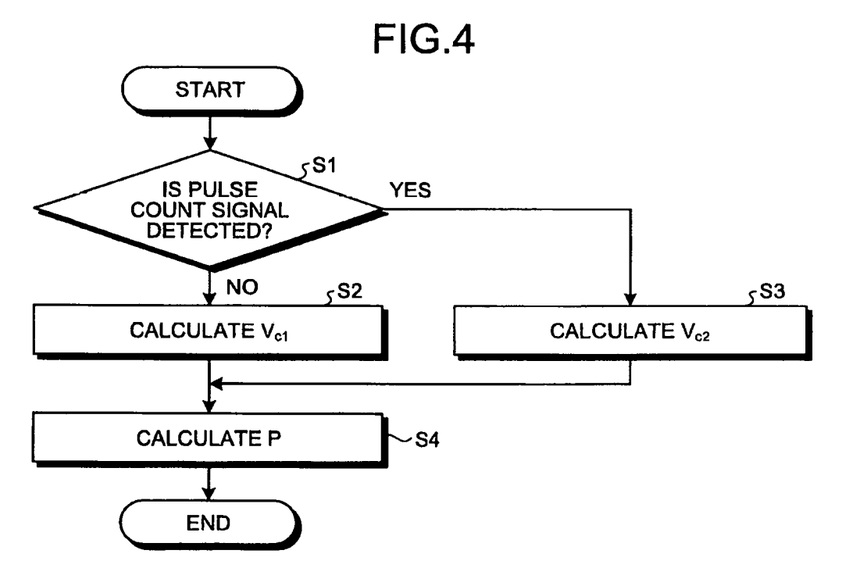
FIG. 4 is a flowchart for explaining the operation of the speed control device according to the first embodiment.

FIG. 4 is a flowchart for explaining the operation of the speed control device according to the first embodiment.

When the train 100 travels at a speed equal to or higher than a fixed speed $V_L$, in the speed control device 8, the AC voltage signal 1a is converted into the pulse signal 2a and the pulse count signal 3a is outputted. However, when the train 100 travels at a speed lower than the fixed speed $V_L$, in the speed control device 8, the pulse signal 2a cannot be converted to a desired signal because a generated voltage of the tacho-generator 1 drops significantly, so that the pulse count signal 3a is not outputted. The fixed speed $V_L$ is assumed to be 5 km/h.

When a rolling prevention brake is released in the train 100, the calculating unit 7 starts processing illustrated in FIG. 3. When the pulse count signal 3a is not detected because the train 100 travels at a speed lower than the fixed speed $V_L$ at S1 that is a signal detecting step (NO at S1), the speed calculating unit 72 calculates the first speed $V_{c1}$ at S2 that is a speed calculating step using a train position Pn−1 in the preceding cycle, a speed Vn−1 in the preceding cycle, a notch position Mn−1 in the preceding cycle, a gradient of a route, a curvature radius of the route, a weight of each car, a tractive force corresponding to a notch, and a brake force corresponding to the notch (S2).

When the pulse count signal 3a is detected because the train 100 travels at a speed equal to or higher than the fixed speed $V_L$ (Yes at S1), the speed calculating unit 72 multiplies the number of counts of the pulse count signal 3a by a coefficient including the diameter of the wheel 10 to calculate the second speed $V_{c2}$ (S3).

The first speed $V_{c1}$ and the second speed $V_{c2}$ calculated at S2 and S3 are retained as the speed information Vn calculated in the present cycle and outputted for a controlled element that uses the speed information Vn. At S4 that is a position calculating step, the position calculating unit 73 calculates the position P of the first car of the train 100 using the speeds calculated at S2 and S3 and outputs the position P (S4).

In this way, even when the generated voltage of the tacho-generator 1 drops during the low-speed traveling, the speed control device 8 in the first embodiment can calculate the latest speed using the notch information 4a, the route data 5a, and the car characteristic data 6a and estimate the position P of the train 100. Therefore, it is possible to calculate a speed with high accuracy even if a new sensor other than the tacho-generator 1 is not added to detect a train speed in a low speed region where the generated voltage of the tacho-generator 1 drops. Thereby, it is possible to prevent an increase in cost and prevent deterioration in reliability.

Further, when the train 100 including the speed control device R in the first embodiment transmits the position P to a ground device by wireless communication, it is possible to accurately control a traveling interval between a preceding train and a following train, so that both of fail-safe property and efficient operation can be realized by a configuration advantageous in cost.

Second Embodiment

Figure 5:
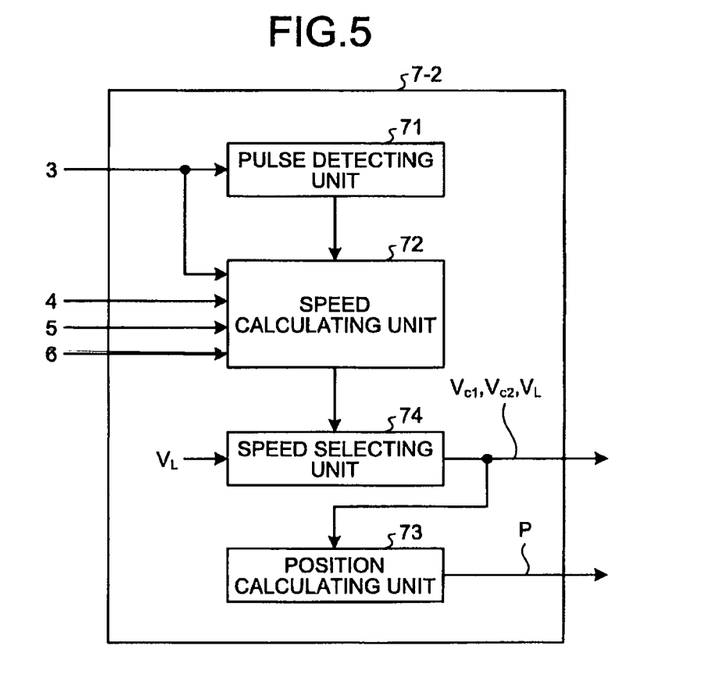
FIG. 5 is a configuration diagram of a calculating unit included in a speed control device according to a second embodiment of the present invention.

FIG. 5 is a configuration diagram of a calculating unit included in a speed control device according to a second embodiment of the present invention. A calculating unit 7-2 in the second embodiment includes a speed selecting unit 74 in addition to the pulse detecting unit 71, the speed calculating unit 72, and the position calculating unit 73. The position calculating unit 73 in the second embodiment calculates the position P using a speed selected by the speed selecting unit 74.

The operation of the speed control device 8 in the second embodiment is explained with reference to FIG. 6 and FIG. 7.

Figure 6:
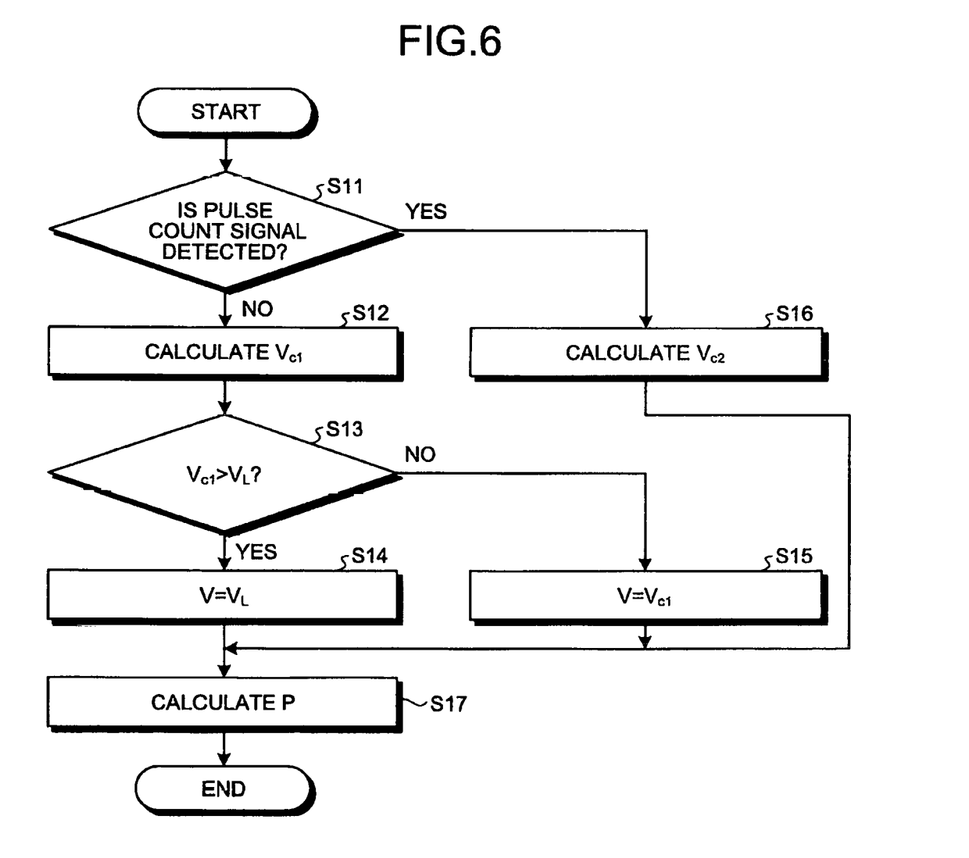
FIG. 6 is a flowchart for explaining the operation of the speed control device according to the second embodiment.

FIG. 6 is a flowchart for explaining the operation of the speed control device according to the second embodiment.

When the pulse count signal 3a is not detected (No at S11), the speed calculating unit 72 calculates the first speed $V_{c1}$ using the train position Pn−1 in the preceding cycle, the speed Vn−1 in the preceding cycle, the notch position Mn−1 in the preceding cycle, a gradient of a route, a curvature radius of the route, the weights of cars, a tractive force corresponding to a notch, and a brake force corresponding to the notch (S12).

The speed selecting unit 74 compares the first speed $V_{c1}$ to the fixed speed $V_L$. When the first speed $V_{c1}$ is higher than the fixed speed $V_L$ (Yes at S13), the speed selecting unit 74 selects the fixed speed $V_L$ from the first speed $V_{c1}$ and the fixed speed $V_L$ as a speed V for calculation of the position P (S14).

When the first speed $V_{c1}$ is lower than the fixed speed $V_L$ (No at S13), the speed selecting unit 74 selects the first speed $V_{c1}$ from the first speed $V_{c1}$ and the fixed speed $V_L$ as the speed V for calculation of the position P (S15).

When the pulse count signal 3a is detected at S11 (Yes at S11), the speed calculating unit 72 multiplies the number of counts of the pulse count signal 3a by a coefficient including the diameter of the wheel 10 to calculate the second speed $V_{c2}$ (S16).

The speed calculated at S14, S15, or S16 is retained as the speed information Vn calculated in the present cycle and outputted for a controlled element that uses the speed information Vn. The position calculating unit 73 calculates the position P of the lead car of the train 100 using the speed calculated at S14, S15, or S16 (S17).

Figure 7:
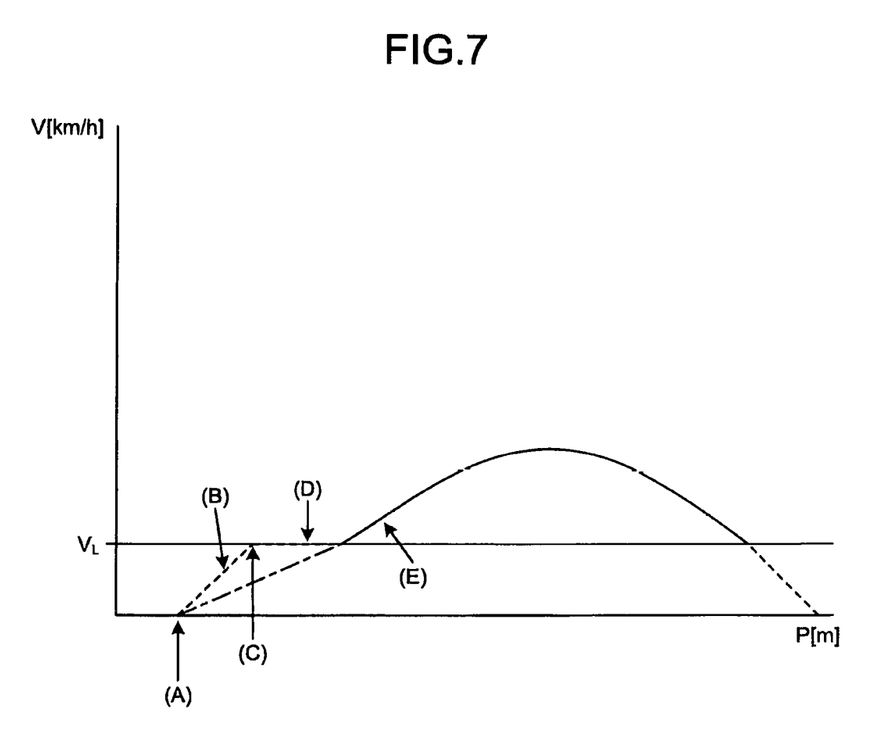
FIG. 7 is a graph for explaining a speed selecting operation in the calculating unit according to the second embodiment.

FIG. 7 is a graph for explaining a speed selecting operation in the calculating unit according to the second embodiment. (A) When the rolling prevention brake is released in the train 100 mounted with the tacho-generator 1, the calculating unit 7-2 starts processing illustrated in FIG. 6 and (B) performs calculation of the first speed $V_{c1}$ and calculation of the position P.

(C) When the first speed $V_{c1}$ exceeds the fixed speed $V_L$ but the pulse count signal 3a cannot be detected, an actual speed of the train 100 cannot be calculated using the AC voltage signal 1a. (D) Therefore, the calculating unit 7-2 calculates the position P using the fixed speed $V_L$ until the pulse count signal 3a is detected. That is, to avoid collision with a preceding train, the position P is calculated using the fixed speed $V_L$ which is the highest speed assumed when the pulse count signal 3a cannot be detected.

(E) When the pulse count signal 3a is detected, the calculating unit 7-2 calculates the position P of the train 100 using the second speed $V_a$.

According to the speed control device 8 in the second embodiment, even when a preceding train is present ahead of the train 100 mounted with the speed control device 8, it is possible to control the position P at the highest speed assumed when the pulse count signal 3a cannot be detected. Therefore, compared with the first embodiment, it is possible to more accurately control the interval between the preceding train and the following train and improve the fail-safe property.

Third Embodiment

Figure 8:
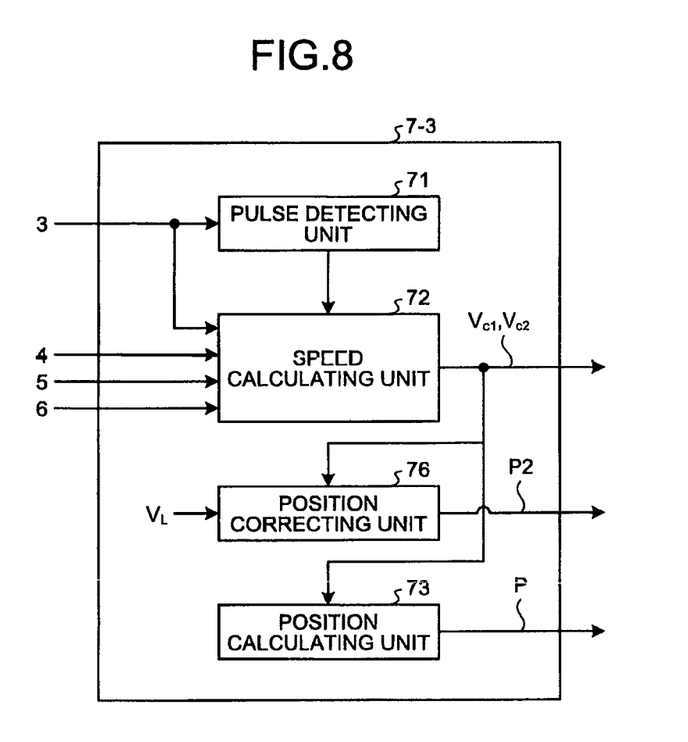
FIG. 8 is a configuration diagram of a calculating unit included in a speed control device according to a third embodiment of the present invention.

FIG. 8 is a configuration diagram of a calculating unit included in a speed control device according to a third embodiment of the present invention. A calculating unit 7-3 in the third embodiment includes a position correcting unit 76 in addition to the pulse detecting unit 71, the speed calculating unit 72, and the position calculating unit 73.

The operation of the speed control device 8 in the third embodiment is explained with reference to FIG. 9 and FIG. 10.

Figure 9:
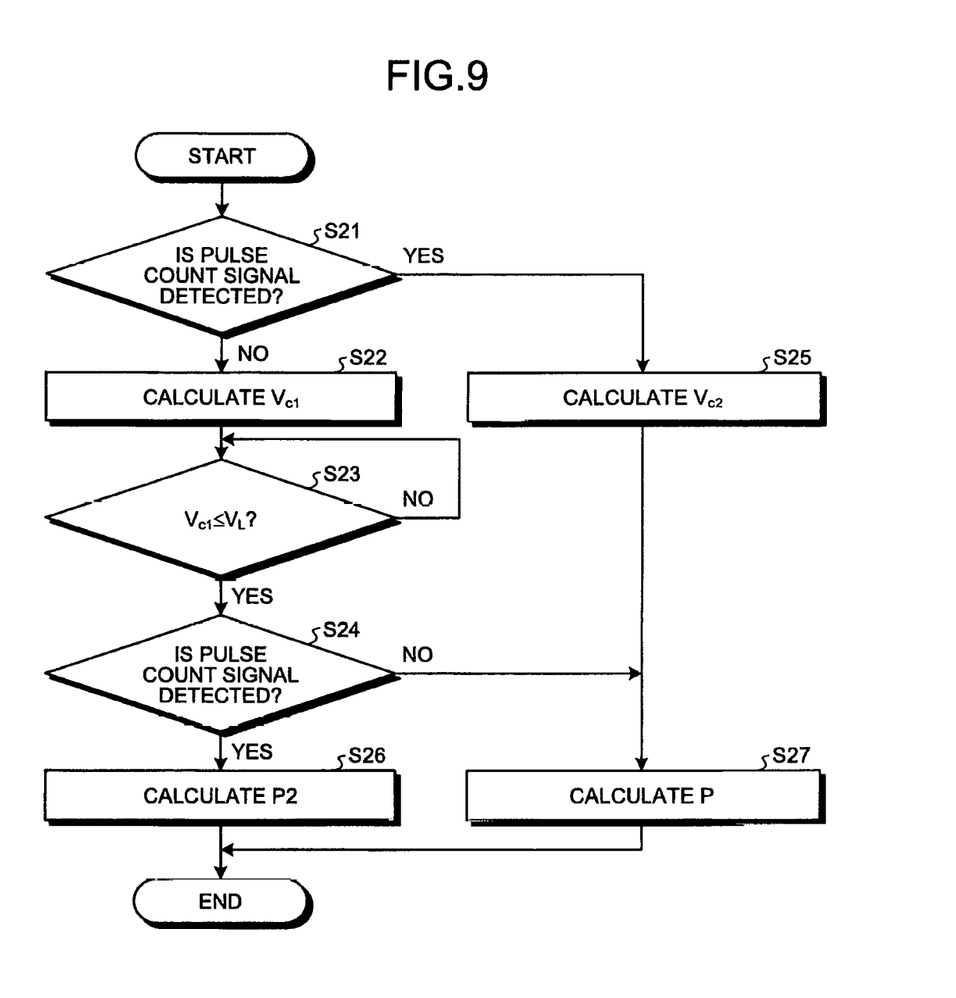
FIG. 9 is a flowchart for explaining the operation of the speed control device according to the third embodiment.

FIG. 9 is a flowchart for explaining the operation of the speed control device according to the third embodiment.

When the pulse count signal 3a is not detected (No at S21), the speed calculating unit 72 calculates the first speed $V_{c1}$ using the train position Pn−1 in the preceding cycle, the speed Vn−1 in the preceding cycle, the notch position Mn−1 in the preceding cycle, a gradient of a route, a curvature radius of the route, the weights of cars, a tractive force corresponding to a notch, and a brake force corresponding to the notch (S22).

The position correcting unit 76 compares the first speed $V_{c1}$ to the fixed speed $V_L$ and repeats the comparison operation until the first speed $V_{c1}$ does not exceed the fixed speed $V_L$ (No at S23). When the first speed $V_{c1}$ is equal to or lower than the fixed speed $V_L$ (Yes at S23), the position correcting unit 76 determines whether or not the pulse count signal 3a is detected, again.

When the pulse count signal 3a is detected (Yes at S24), the position correcting unit 76 corrects the position of a train using a time from release of the rolling prevention brake until the detection of the pulse count signal 3a and calculates a position P2 that has been subjected to the correction (S26).

Specifically, the position correcting unit 76 calculates the position P of the lead car of the train 100 after Δt seconds from the present time using the first speed $V_{c1}$ that is a present speed $V_M$, according to the following Expression (2). Subsequently, the position correcting unit 76 calculates a correction amount L according to the following Expression (3). Further, the position correcting unit 76 calculates the position P2 obtained by subtracting the correction amount L from the position P after Δt seconds according to the following Expression (4). In other words, the position correcting unit 76 adjusts the position P of the lead car of the train 100 to be shifted by a fixed distance in the opposite direction to a traveling direction of the train 100.

Position P after Δt seconds=present position P+Δt× present speed $V_M$ (2)

Correction amount $L=\Delta t \times (V_L-V_M)/2$ (3)

Position P2=position P after Δt seconds−correction amount L (4)

When the pules count signal 3a is detected at S21 (Yes at S21), the speed calculating unit 72 multiplies the number of counts of the pulse count signal 3a by a coefficient including the diameter of the wheel 10 to calculate the second speed $V_{c2}$ (S25).

When the pulse count signal 3a is not detected at S24 (No at S24), the position calculating unit 73 calculates the position P of the lead car of the train 100 using the speed calculated at S22 and outputs the position P. The position calculating unit 73 calculates the position P using the speed calculated at S25 and outputs the position P (S27).

Figure 10:
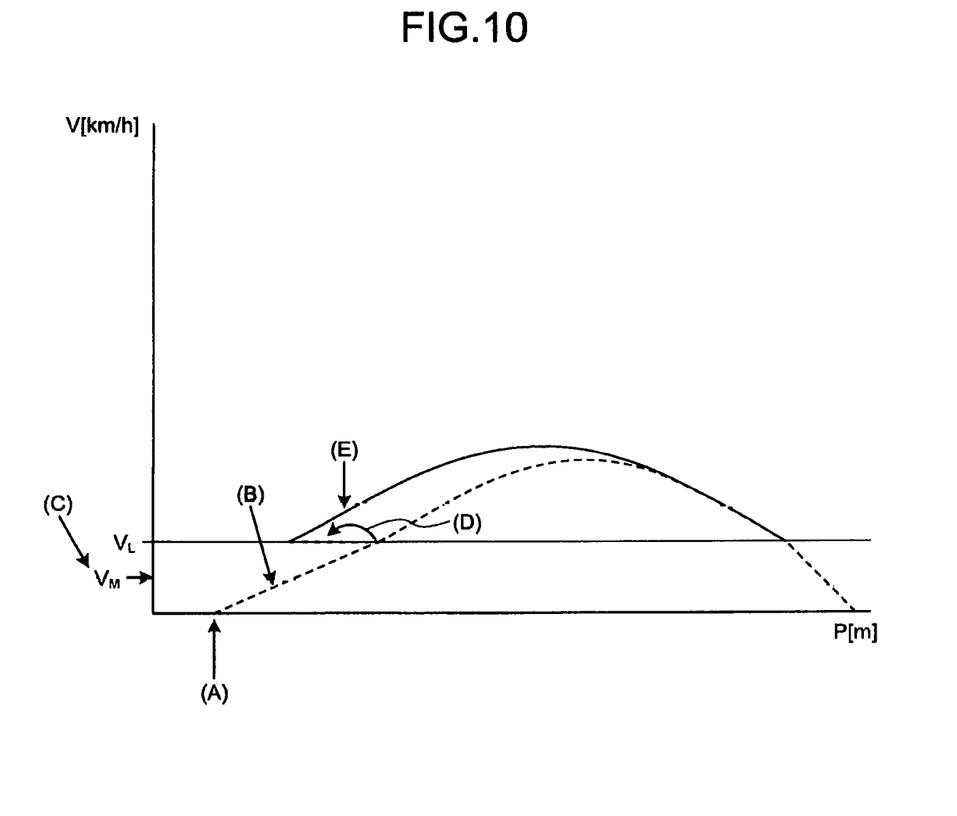
FIG. 10 is a graph for explaining a position correcting operation in the calculating unit according to the third embodiment.

FIG. 10 is a graph for explaining a position correcting operation in the calculating unit according to the third embodiment. (A) When the rolling prevention brake is released in the train 100 mounted with the tacho-generator 1, the calculating unit 7-3 starts the processing illustrated in FIG. 9 and (B) performs calculation of the first speed $V_{c1}$ and calculation of the position P.

(C) When the pulse count signal 3a is detected in a state in which the calculated first speed $V_{c1}$ that is the present speed $V_M$, does not exceed the fixed speed $V_L$, the first speed $V_{c1}$ estimated when the pulse count signal 3a is detected is likely to be higher than an actual train speed. (D) Therefore, the position calculating unit 73 calculates the position P2 obtained by correcting the position P after Δt seconds with the correction amount L according to the above Expression (2) to Expression (4). In this way, the position of the train 100 at the time when the first speed $V_{c1}$ is equal to or lower than the fixed speed $V_L$ is adjusted to be shifted by a fixed distance in the opposite direction to a traveling direction of the train 100 as illustrated in FIG. 10.

(E) When the first speed $V_{c1}$ exceeds the fixed speed $V_L$ and the pulse count signal 3a is detected, the calculating unit 7-3 calculates the second speed $V_{c2}$ and calculates the position P of the train 100 using the second speed $V_{c2}$.

With the speed control device 8 in the third embodiment, even when there is an error between a value of the fixed speed $V_L$ set in the speed control device 8 and an actual speed of the train 100 at a timing when the pulse count signal 3a is detected, the position P of the train 100 can be corrected. Therefore, compared with the first embodiment, it is possible to more accurately control the traveling interval between the preceding train and the following train and improve the fail-safe property.

Figure 11:
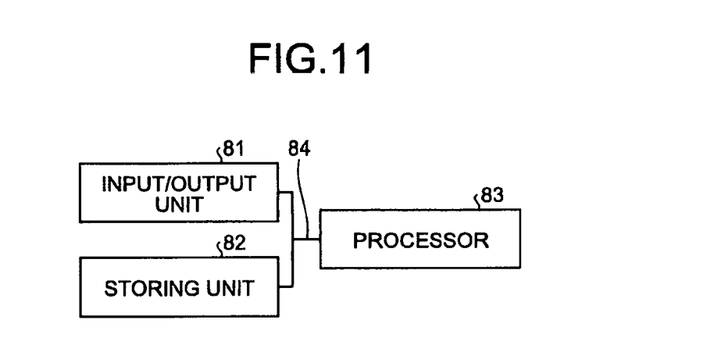
FIG. 11 is a hardware configuration diagram of the speed control devices according to the first to third embodiments of the present invention.

FIG. 11 is a hardware configuration diagram of the speed control device according to the first to third embodiments of the present invention.

The speed control device 8 in each of the embodiments includes an input/output unit 81, a storing unit 82, and a processor 83. The input/output unit 81, the storing unit 82, and the processor 83 are interconnected by a data bus 84.

The input/output unit 81 is an interface circuit for causing the storing unit 82 to store information transmitted from an external device and for the processor 83 to transmit information to and receive information from the external device. In each of the embodiments, the AC voltage signal 1a and the notch information 4a are inputted to the input/output unit 81, and speed and position information concerning the first speed $V_{c1}$, the second speed $V_{c2}$, and the position P is outputted to the external device of the speed control device 8 via the input/output unit 81. Examples of a transmission destination of the speed and position information include a protective device mounted on the train 100, a train-information managing device mounted on the train 100, and a ground control device set on the ground side.

As a type of the storing unit 82, a Random Access Memory (RAM), a Read Only Memory (ROM), or a Solid State Drive (SSD) can be illustrated. The storing unit 82 stores a program for the processor 83. The storing unit 82 stores the route data 5a and the car characteristic data 6a. The storing unit 82 temporarily stores the AC voltage signal 1a inputted via the input/output unit 81 and the notch information 4a. Further, the storing unit 82 temporarily stores the first speed $V_{c1}$, the second speed $V_{c2}$, and the position P.

The processor 83 is represented by a circuit such as a Central Processing Unit (CPU) or a Micro Processing Unit (MPU). The processor 83 includes the signal converting unit 2, the pulse count unit 3, and the calculating units 7, 7-2, or 7-3. The processor 83 executes the program stored in the storing unit 82, and thereby the signal converting unit 2, the pulse count unit 3, and the calculating units 7, 7-2, or 7-3 are implemented.

Fourth Embodiment

Figure 12:
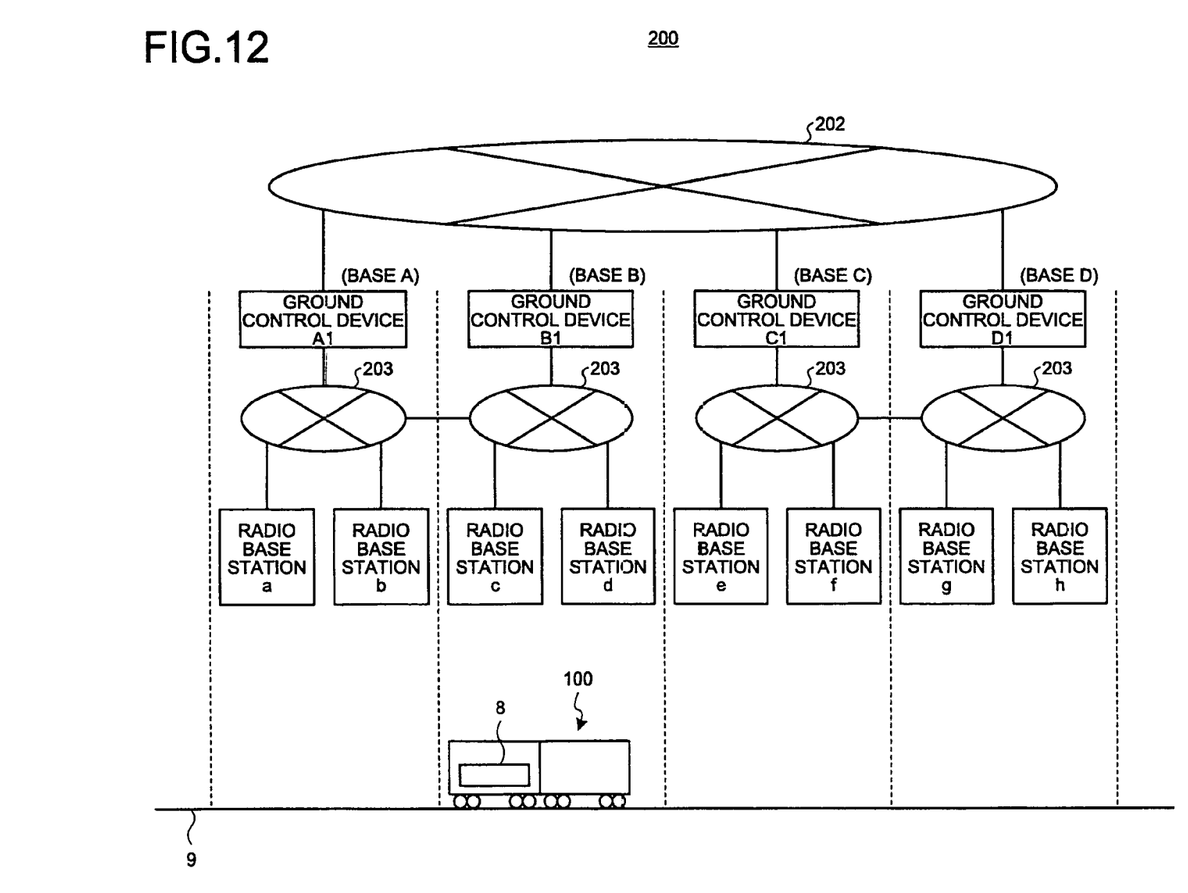
FIG. 12 is a configuration diagram of a wireless train control system according to a fourth embodiment of the present invention.

FIG. 12 is a configuration diagram of a wireless train control system according to a fourth embodiment of the present invention. In the fourth embodiment, description is given for a system that uses the speed and the position of the train 100 calculated by the speed control device 8 according to the first to third embodiments.

A wireless train control system 200 illustrated in FIG. 12 is configured to include a plurality of ground control devices A1, B1, C1, and D1 connected via a network 202, and a plurality of radio base stations "a" to "h" connected to the ground control devices A1, B1, C1, and D1 via networks 203.

The wireless train control system 200 is configured such that a route 9 is divided into bases A, B, C, and D which are a number of control regions, the ground control devices A1, B1, C1, and D1 are provided in the bases A, B, C, and D, respectively, and the ground control devices A1, B1, C1, and D1 manage the train 100 in the bases. Each of the ground control devices A1, B1, C1, and D1 transmits and receives information necessary for train control to/from the other of the ground control devices A1, B1, C1, and D1 via the network 202.

In the wireless train control system 200 illustrated in FIG. 12, four ground control devices A1, B1, C1, and D1 are used. Two radio base stations are connected to each of the ground control devices A1, B1, C1, and D1. However, the number of ground control devices and the number of radio base stations are not limited by this example.

Figure 13:
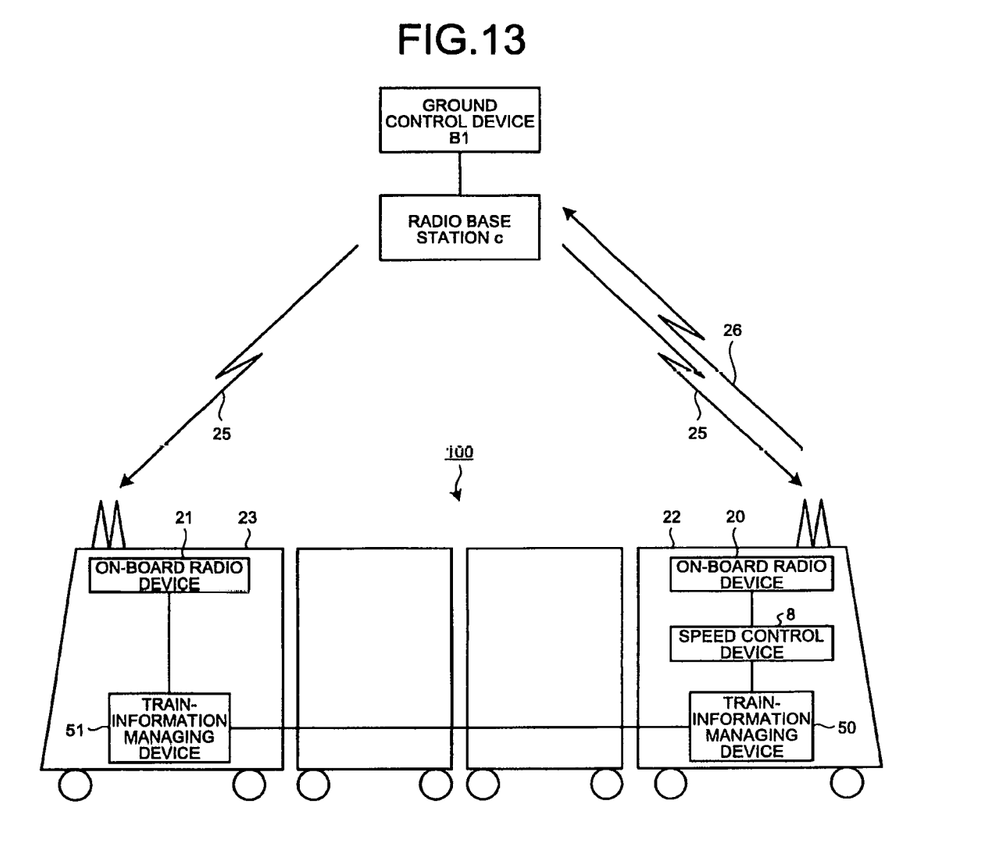
FIG. 13 is a configuration diagram of train-mounted devices used in the wireless train control system illustrated in FIG. 12.

FIG. 13 is a configuration diagram of train-mounted devices used in the wireless train control system illustrated in FIG. 12. In FIG. 13, the train 100 currently communicating with the radio base station "c" is illustrated.

The speed control device 8, an on-board radio device 20, and a train-information managing device 50 are mounted on one lead car 22 of the train 100. An on-board radio device 21 and a train-information managing device 51 are mounted on another lead car 23 of the train 100.

In FIG. 13, examples of the car-mounted devices are illustrated. However, it goes without saying that the actual train 100 is equipped with not only the illustrated devices but also devices such as a tacho-generator, a brake control device, and an on-board antenna.

The speed control device 8 is connected to the on-board radio device 20 and the train-information managing device 50 by a transmission line in the lead car 22. The on-board radio device 21 and the train-information managing device 51 are connected by a transmission line in the lead car 23.

Between the train 100 and the radio base station "c", information 25 is transmitted from the radio base station "c" to the train 100 and information 26 is transmitted from the train 100 to the radio base station "c". The information 25 is information transmitted from the ground side to the on-board side. The information 26 is information transmitted from the on-board side to the ground side.

Figure 14:
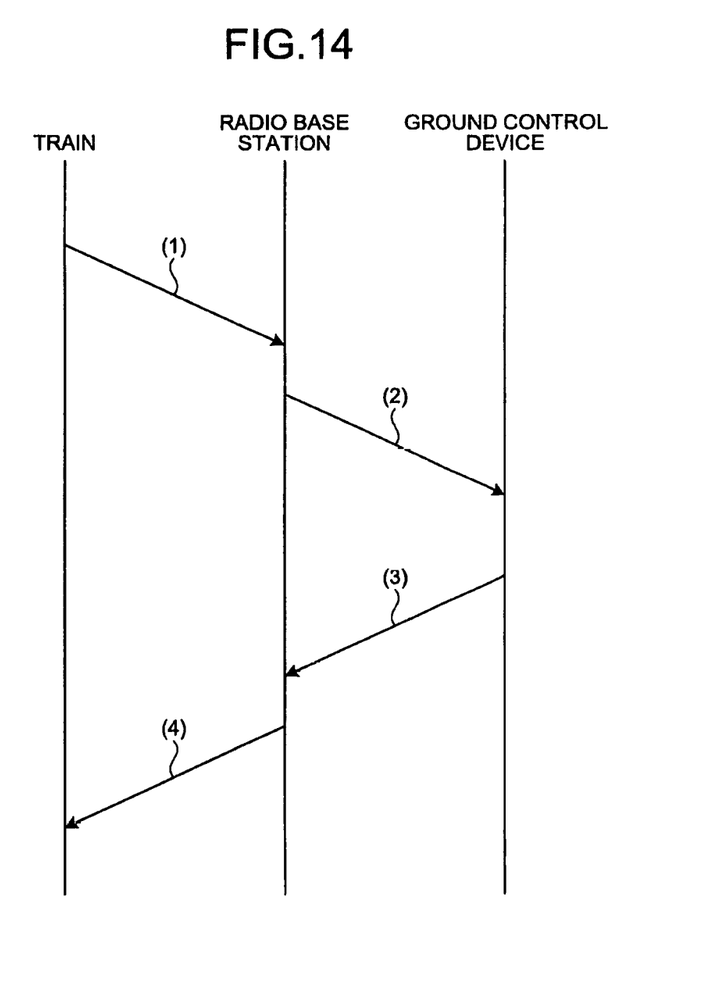
FIG. 14 is a timing chart illustrating information transmitted in the wireless train control system according to the fourth embodiment of the present invention.

FIG. 14 is a timing chart illustrating information transmitted in the wireless train control system according to the fourth embodiment of the present invention.

(1) Position information calculated by the speed control device 8 mounted on the train 100 is transmitted to the on-board radio device 20. The on-board radio device 20 having received the position information sets the position information in a specific transmission frame. A train ID for identifying each train is also set in the transmission frame besides the position information. The transmission frame is transmitted as the information 26 to a radio base station in a base of a ground control device that manages the train 100.

(2) The radio base station having received the information 26 extracts the position information. The extracted position information is transmitted to a ground control device that manages the radio base station.

(3) The ground control device having received the position information detects the position of a train traveling in a base of the ground control device, performs exchange of the position information between the ground control device and other ground control devices, and generates stop limit position information with respect to a following train on the basis of the position information. The generated stop limit position information is transmitted to the radio base station.

Note that, in each of the ground control devices, on-rail management information indicating which base a train present in a base is present on is created. The on-rail management information is transmitted to a host management system such as an operation management system. In the host management system, the positions of all trains in the system are recognized on the basis of the on-rail management information transmitted from the ground control devices.

(4) The radio base station having received the stop limit position information sets the stop limit position information in a transmission frame. A base station ID for identifying the radio base station is set in the transmission frame besides the stop limit position information. The transmission frame is received as the information 25 by the on-board radio devices 20 and 21 mounted on a following train.

The on-board radio devices 20 and 21 having received the information 25 extract the stop limit position information included in the information 25, and transmit the stop limit position information to the speed control device 8. The speed control device 8 generates a speed check pattern on the basis of the stop limit position information and compares the generated speed check pattern with the speed information. When the speed information exceeds the speed check pattern, the speed control device 8 generates a brake command and outputs the brake command to a not-illustrated brake control device.

With the wireless train control system 200 configured in this way, it is possible to perform speed control of a train without using the conventional track circuit. This leads to not only a possibility to achieve a reduction in cost and improvement of safety, but also a possibility to improve transportation efficiency based on execution of appropriate train interval control.

The wireless train control system 200 uses the speed control device 8 of the first to third embodiments. Therefore, it is possible to accurately perform speed control of the train 100 in a low speed region while preventing an increase in cost.

The configurations explained above in the embodiments indicate examples of the content of the present invention, and so can be combined with other publicly-known techniques and partially omitted and/or modified without departing from the spirit and scope of the present invention.

REFERENCE SIGNS LIST 1 tacho-generator; 1a AC voltage signal; 2 signal converting unit; 2a pulse signal; 3 pulse count unit; 3a pulse count signal; 4 master controller; 4a notch information; 5 route database; 5a route data; 6 car characteristic database; 6a car characteristic data; 7, 7-2, 7-3 calculating unit; 8 speed control device; 9 route; 10 wheel; 11 rail; 20, 21 on-board radio device; 25, 26 information; 50, 51 train-information managing device; 71 pulse detecting unit; 72 speed calculating unit; 73 position calculating unit; 74 speed selecting unit; 76 position correcting unit; 81 input/output unit; 82 storing unit; 83 processor; 84 data bus; 100 train 200 wireless train control system; 202, 203 network.

The invention claimed is:

1. A speed control device that controls a speed of a train using a tacho-generator, comprising:
   a processor; and
   a memory storing instructions that, when executed by the processor, cause the speed control device to:
   determine whether a pulse count signal obtained by conversion from an AC voltage signal that is outputted from the tacho-generator and corresponds to a number of revolutions of a wheel of the train is detected;
   in response to a determination that the pulse count signal is not detected, calculate a first speed using notch information outputted from a master controller, information of a route database for managing route data, and information of a car characteristic database for managing car characteristic data;
   in response to a determination that the pulse count signal is detected, calculate a second speed using the pulse count signal;
   in response to calculating the first speed, determine whether the first speed does not exceed a fixed speed;
   in response to a determination that the first speed does not exceed the fixed speed, determine whether the pulse count signal is detected;
   in response to a determination that the pulse count signal is detected after a determination that the first speed does not exceed the fixed speed, correct a position of the train;
   wherein the correction is performed by subtracting a fixed amount from a position after $\Delta t$ seconds from a present time, the position being calculated using the first speed,
   the fixed amount is calculated according to $\Delta t \times (V_L - V_M)/2$,
   $V_L$ is the fixed speed, and
   $V_M$ is the first speed.

2. A wireless train control system that displays the position calculated by the speed control device according to claim 1.

3. A speed control method applied to a speed control device that controls a train speed using a tacho-generator, the speed control method comprising:
   determining, by the speed control device, whether a pulse count signal obtained by conversion from an AC voltage signal that is outputted from the tacho-generator and corresponds to a number of revolutions of a wheel of a train is detected;
   in response to determining that the pulse count signal is not detected, calculating a speed using notch information outputted from a master controller, information of a route database for managing route data, and information of a car characteristic database for managing car characteristic data;
   in response to calculating the speed, determining whether the speed does not exceed a fixed speed;
   in response to determining that the speed does not exceed the fixed speed, determine whether the pulse count signal is detected; and
   in response to determining that the pulse count signal is detected after determining that the speed does not exceed the fixed speed, correcting a position of the train,
   wherein the correction is performed by subtracting a fixed amount from a position after $\Delta t$ seconds from a present time, the position being calculated using the speed,
   the fixed amount is calculated according to $\Delta t \times (V_L - V_M)/2$,
   $V_L$ is the fixed speed, and
   $V_M$ is the speed.

* * * * *